United States Patent
Fasola et al.

(10) Patent No.: US 11,549,815 B2
(45) Date of Patent: Jan. 10, 2023

(54) MAP CHANGE DETECTION

(71) Applicant: GM Cruise Holdings LLC, San Francisco, CA (US)

(72) Inventors: Juan Fasola, San Francisco, CA (US); Harman Kumar, San Francisco, CA (US); Yu-Cheng Lin, San Francisco, CA (US); Xiaoyu Zhou, San Francisco, CA (US)

(73) Assignee: GM Cruise Holdings LLC., San Francisco, CA (US)

(*) Notice: Subject to any disclaimer, the term of this patent is extended or adjusted under 35 U.S.C. 154(b) by 117 days.

(21) Appl. No.: 16/456,385

(22) Filed: Jun. 28, 2019

(65) Prior Publication Data

US 2020/0408535 A1 Dec. 31, 2020

(51) Int. Cl.
*G01C 21/32* (2006.01)
*G01C 21/36* (2006.01)
*G01S 17/88* (2006.01)
*G05D 1/02* (2020.01)

(52) U.S. Cl.
CPC ......... *G01C 21/32* (2013.01); *G01C 21/3626* (2013.01); *G01S 17/88* (2013.01); *G05D 1/0231* (2013.01)

(58) Field of Classification Search
CPC ..... G01C 21/32; G01C 21/3626; G01S 17/88; G01S 17/86; G01S 7/4808; G01S 17/931; G05D 1/0231
See application file for complete search history.

(56) References Cited

U.S. PATENT DOCUMENTS

| | | |
|---|---|---|
| 8,521,352 B1 | 8/2013 | Ferguson et al. |
| 8,718,861 B1 | 5/2014 | Montemerlo et al. |
| 10,474,164 B2 * | 11/2019 | Wheeler ............. G08G 1/04 |
| 10,584,971 B1 * | 3/2020 | Askeland ........... G01C 21/30 |
| 11,016,484 B2 | 5/2021 | Ando |
| 2002/0105438 A1 | 8/2002 | Forbes et al. |
| 2012/0121183 A1 | 5/2012 | Joshi |
| 2016/0180177 A1 * | 6/2016 | Nguyen ............. G06V 20/588 382/104 |
| 2018/0188037 A1 * | 7/2018 | Wheeler ............. B60W 40/02 |
| 2018/0188038 A1 * | 7/2018 | Yang .................. G06T 7/248 |
| 2018/0188742 A1 * | 7/2018 | Wheeler ............. G08G 1/04 |
| 2018/0224285 A1 | 8/2018 | Stajner et al. |
| 2019/0018410 A1 | 1/2019 | Ando |
| 2019/0180118 A1 * | 6/2019 | Kraeling ............ G06V 20/56 |

(Continued)

*Primary Examiner* — Rami Khatib
*Assistant Examiner* — Gabriel J Lambert
(74) *Attorney, Agent, or Firm* — Polsinelli PC

(57) ABSTRACT

The present technology provides systems, methods, and devices that can update aspects of a map as an autonomous vehicle navigates a route, and therefore avoids the need for dispatching a special purpose mapping vehicle for these updates. As the autonomous vehicle navigates the route, data captured by at least one sensor of an autonomous vehicle can indicate an inconsistency between pre-mapped from a high-resolution sensor system describing a location on a map, and current data describing a new feature of the location. The current data can be clustered together based on a threshold spatial closeness, where the clustering describes the new feature, and semantic labels of the pre-mapped data from the high-resolution sensor system can be updated based on the new feature described by the clustered current data.

17 Claims, 7 Drawing Sheets

(56) References Cited

U.S. PATENT DOCUMENTS

| | | |
|---|---|---|
| 2019/0204089 A1 | 7/2019 | Rochan Meganathan et al. |
| 2019/0265050 A1* | 8/2019 | Fujimoto ............ G01C 21/3881 |
| 2020/0041285 A1* | 2/2020 | Kato ..................... G09B 29/003 |
| 2020/0098135 A1* | 3/2020 | Ganjineh .............. G06V 20/588 |
| 2020/0103236 A1* | 4/2020 | Adams ................. G05D 1/0231 |
| 2020/0296558 A1* | 9/2020 | Adare .................... G01C 21/32 |
| 2020/0363214 A1* | 11/2020 | Langhans ............... G01C 21/28 |
| 2020/0365013 A1 | 11/2020 | Simon et al. |
| 2020/0380773 A1 | 12/2020 | Gundling et al. |
| 2020/0401823 A1 | 12/2020 | Miller et al. |

* cited by examiner

MAP CHANGE DETECTION

TECHNICAL FIELD

The present technology pertains to updating a portion of a map database using data captured by an autonomous vehicle, and more specifically pertains to updating a portion of a map database having high-resolution data using data obtained from an autonomous vehicle.

BACKGROUND

An autonomous vehicle is a motorized vehicle that can navigate without a human driver. An exemplary autonomous vehicle includes a plurality of sensor systems, such as, but not limited to, a camera sensor system, a LIDAR sensor system, a radar sensor system, amongst others, where the autonomous vehicle operates based upon sensor signals output by the sensor systems. Specifically, the sensor signals are provided to an internal computing system in communication with the plurality of sensor systems, where a processor executes instructions based upon the sensor signals to control a mechanical system of the autonomous vehicle, such as a vehicle propulsion system, a braking system, or a steering system.

The autonomous vehicle navigates using a combination of data captured by at least one sensor of the autonomous vehicle and a map stored on the autonomous vehicle. The map is commonly created using a special purpose mapping vehicle which captures data at a much higher resolution than the at least one sensor on the autonomous vehicle. However, the configuration of roads commonly changes due to construction, lane changes, or other factors. When this happens the autonomous vehicle can run into issues navigating based on outdated maps, and the road portions where the inconsistencies exist become restricted areas for the autonomous vehicle until the map is updated.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
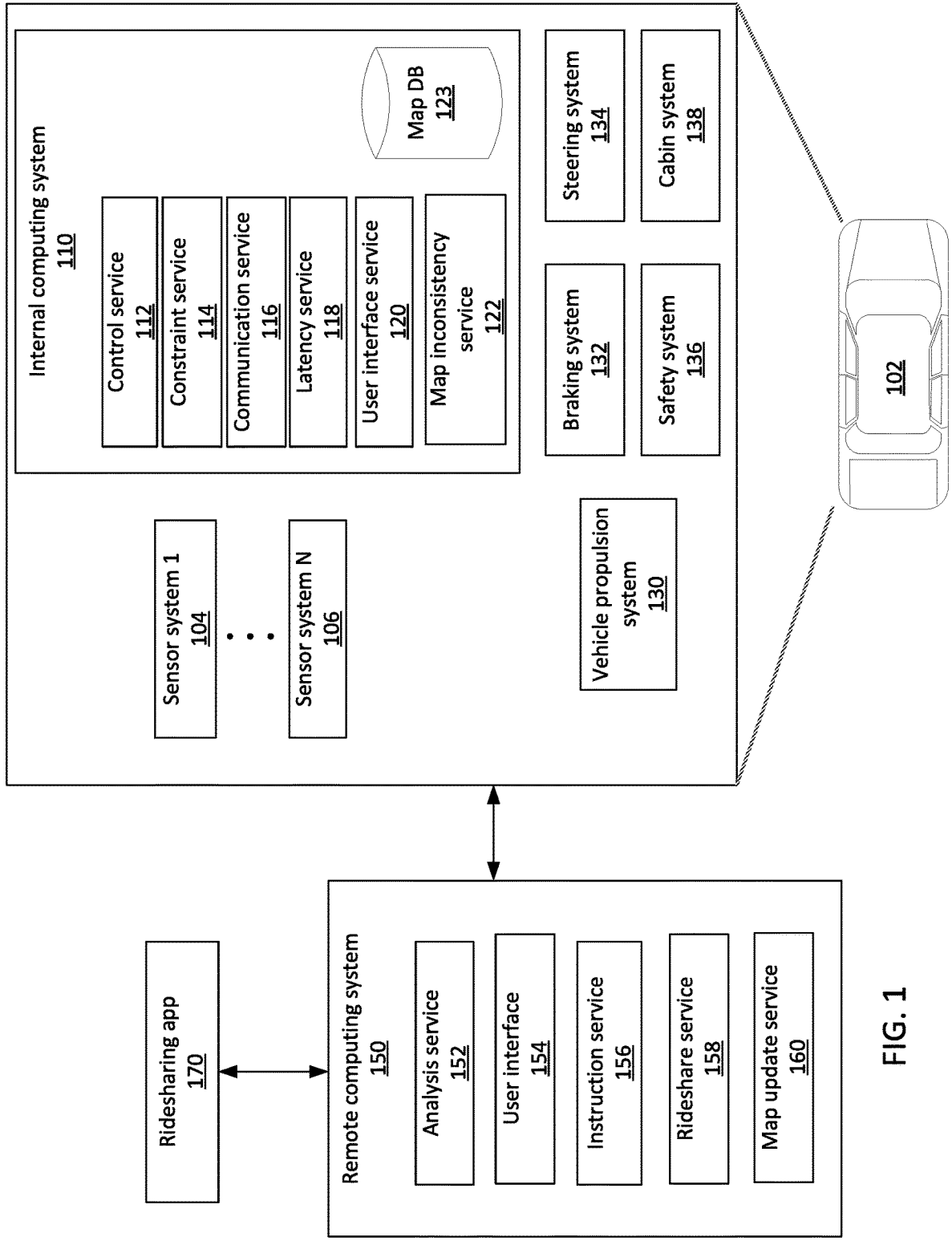
FIG. 1 shows an example system for piloting and management of an autonomous vehicle in accordance with some aspects of the present technology.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

The disclosed technology addresses the need in the art for a technology that can quickly update a map used for routing an autonomous vehicle that reflects changing current conditions without the need for a special purpose mapping vehicle or manual intervention.

The autonomous vehicle navigates using a combination of data captured by at least one sensor of the autonomous vehicle and a map stored on the autonomous vehicle. The map is commonly created using a special purpose mapping vehicle which captures data at a much higher resolution than the at least one sensor on the autonomous vehicle. In this way, the map that informs autonomous vehicle navigation is generated before navigation, so that routes to specific destinations can be determined as soon as a destination is received. However, environmental conditions can change since the special purpose mapping vehicle mapped the route. For example, if a road on the route has been repainted (lanes added, removed, or otherwise modified) since the last time the special purpose mapping vehicle mapped the route, and the autonomous vehicle relies on the map's semantic boundaries to drive, then the autonomous vehicle would not behave correctly on the road since the lane lines have been modified. Since updating the high-resolution map requires the special purpose mapping vehicle, a significant period of time can pass before the high-resolution map is updated.

The disclosed technology solves the above issues by enabling various embodiments to find areas where the lane lines have changed with respect to the map. The scope of the change can trigger various responses, such as determining which portions of the map can be trusted (e.g., use the already stored semantic boundaries in certain portions) vs needs updating (e.g., don't use the already stored semantic boundaries), detecting lane lines on a live basis and redrawing semantic boundaries based on the detected lines, or deciding when to call remote assistance after stopping the autonomous vehicle.

The present technology provides a system that can update the semantic labels of the map stored on the autonomous vehicle on a live basis using data from the sensors of the autonomous vehicle, and therefore avoids the need for dispatching the special purpose mapping vehicle for these updates. This makes planning routes and routing the autonomous vehicle more efficient and significantly reduces the amount of down time before a map update can be issued. The present technology also reduces the work load on the special purpose mapping vehicle because it is dispatched less often, and therefore, even when the map needs data from the special purpose mapping vehicle for an update, the time taken to update the map is shortened due to a reduction in the number of jobs queued for the special purpose mapping vehicle. Therefore, whether the special purpose mapping vehicle is needed or not, semantic label updates can be issued more quickly, and the periods in which areas are restricted to autonomous vehicles due to outdated maps are shortened.

In the following systems and methods, as the autonomous vehicle navigates the route, data captured by sensors of the autonomous vehicle can indicate an inconsistency between pre-mapped data from a high-resolution sensor system describing a location on a map, and current data describing a new feature of the location. The current data can be clustered together based on a threshold spatial closeness, where the clustering describes the new feature, and the semantic labels of the pre-mapped data can be updated to include the new feature described by the clustered current data.

FIG. 1 illustrates environment 100 that includes an autonomous vehicle 102 in communication with a remote computing system 150.

The autonomous vehicle 102 can navigate about roadways without a human driver using sensor signals output by sensor systems 104-106 of the autonomous vehicle 102 and a map stored in map database 123. The autonomous vehicle 102 includes a plurality of sensor systems 104-106 (a first sensor system 104 through an Nth sensor system 106). The sensor systems 104-106 are of different types and are arranged about the autonomous vehicle 102. For example, the first sensor system 104 may be a camera sensor system and the Nth sensor system 106 may be a LIDAR sensor system. Other exemplary sensor systems include radar sensor systems, global positioning system (GPS) sensor systems, inertial measurement units (IMU), infrared sensor systems, laser sensor systems, sonar sensor systems, and the like.

The autonomous vehicle 102 further includes several mechanical systems that are used to effectuate appropriate motion of the autonomous vehicle 102. For instance, the mechanical systems can include but are not limited to, a vehicle propulsion system 130, a braking system 132, and a steering system 134. The vehicle propulsion system 130 may include an electric motor, an internal combustion engine, or both. The braking system 132 can include an engine brake, brake pads, actuators, and/or any other suitable componentry that is configured to assist in decelerating the autonomous vehicle 102. The steering system 134 includes suitable componentry that is configured to control the direction of movement of the autonomous vehicle 102 during navigation.

The autonomous vehicle 102 further includes a safety system 136 that can include various lights and signal indicators, parking brake, airbags, etc. The autonomous vehicle 102 further includes a cabin system 138 that can include cabin temperature control systems, in-cabin entertainment systems, etc.

The autonomous vehicle 102 additionally comprises an internal computing system 110 that is in communication with the sensor systems 104-106 and the systems 130, 132, 134, 136, and 138. The internal computing system includes at least one processor and at least one memory having computer-executable instructions that are executed by the processor. The computer-executable instructions can make up one or more services responsible for controlling the autonomous vehicle 102, communicating with remote computing system 150, receiving inputs from passengers or human co-pilots, logging metrics regarding data collected by sensor systems 104-106 and human co-pilots, etc.

The internal computing system 110 can include a control service 112 that is configured to control operation of the vehicle propulsion system 130, the braking system 132, the steering system 134, the safety system 136, and the cabin system 138. The control service 112 receives sensor signals from the sensor systems 104-106 as well communicates with other services of the internal computing system 110 to effectuate operation of the autonomous vehicle 102. In some embodiments, control service 112 may carry out operations in concert one or more other systems of autonomous vehicle 102.

The internal computing system 110 can also include a constraint service 114 to facilitate safe propulsion of the autonomous vehicle 102. The constraint service 114 includes instructions for activating a constraint based on a rule-based restriction upon operation of the autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 112.

The internal computing system 110 can also include a communication service 116. The communication service can include both software and hardware elements for transmitting and receiving signals from/to the remote computing system 150. The communication service 116 is configured to transmit information wirelessly over a network, for example, through an antenna array that provides personal cellular (long-term evolution (LTE), 3G, 5G, etc.) communication.

In some embodiments, one or more services of the internal computing system 110 are configured to send and receive communications to remote computing system 150 for such reasons as reporting data for training and evaluating machine learning algorithms, requesting assistance from remoting computing system or a human operator via remote computing system 150, software service updates, map updates, ridesharing pickup and drop off instructions etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, the latency service 118 can enable other systems of autonomous vehicle 102 or a passenger to make necessary decisions or to provide the needed feedback.

The internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

The map inconsistency service 122 can compare data collected by sensors 104-106 to the map stored in map database 123. The map, for example, can be initially created using pre-mapped data. The configuration of roads commonly changes due to repainting, construction, or other factors. When this happens, the map inconsistency service 122 determines that the map stored in map database 123 reflects inconsistencies as compared with current conditions, and the road portions where the inconsistencies exist can be flagged for the autonomous vehicle until the map is updated. The map inconsistency service 122 can communicate with map update service 160 via the communication service 116 to receive updated portions of the map.

As described above, the remote computing system 150 is configured to send/receive a signal from the autonomous vehicle 102 regarding reporting data for training and evaluating machine learning algorithms, requesting assistance from remote computing system 150 or a human operator via the remote computing system 150, software service updates, map updates, rideshare pickup and drop off instructions, etc.

The remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing applications 170 operating on (potential) passenger computing devices. The rideshare service 158 can receive requests to be picked up or dropped off from passenger ridesharing app 170 and can dispatch autonomous vehicle 102 for the trip. The rideshare service 158 can also act as an intermediary between the ridesharing app 170 and the autonomous vehicle wherein a passenger might provide instructions to the autonomous vehicle 102 to go around an obstacle, change routes, honk the horn, etc.

As introduced above, the present technology provides a system that can identify changed aspects of the map stored on the autonomous vehicle's 102 map database 123 using low-resolution data from the at least one sensor 104-106 of the autonomous vehicle 102. In some embodiments, the initial map can include pre-mapped data that includes a high density of points obtained from a high-resolution LIDAR system on a special purpose mapping vehicle, otherwise referred to as a high-resolution point map, and semantic labels that identify features represented in the high density of points obtained from the high-resolution LIDAR system. The semantic labels can identify features such as lane lines, line colors, driveways, locations of stop signs and stoplights, crosswalks, etc. In one or more embodiments, the map can further include low-resolution point map data indicative of updates to the pre-mapped features and semantic labels as described herein.

In some embodiments, the present technology can use low-resolution data from the at least one sensor 104-106 of the autonomous vehicle 102 to detect new features, and an administrator can manually relabel the semantic labels on top of the existing high density of points obtained from the high-resolution LIDAR system already represented in the stored pre-mapped map. In some embodiments, the semantics labels may be relabeled automatically.

Figure 2:
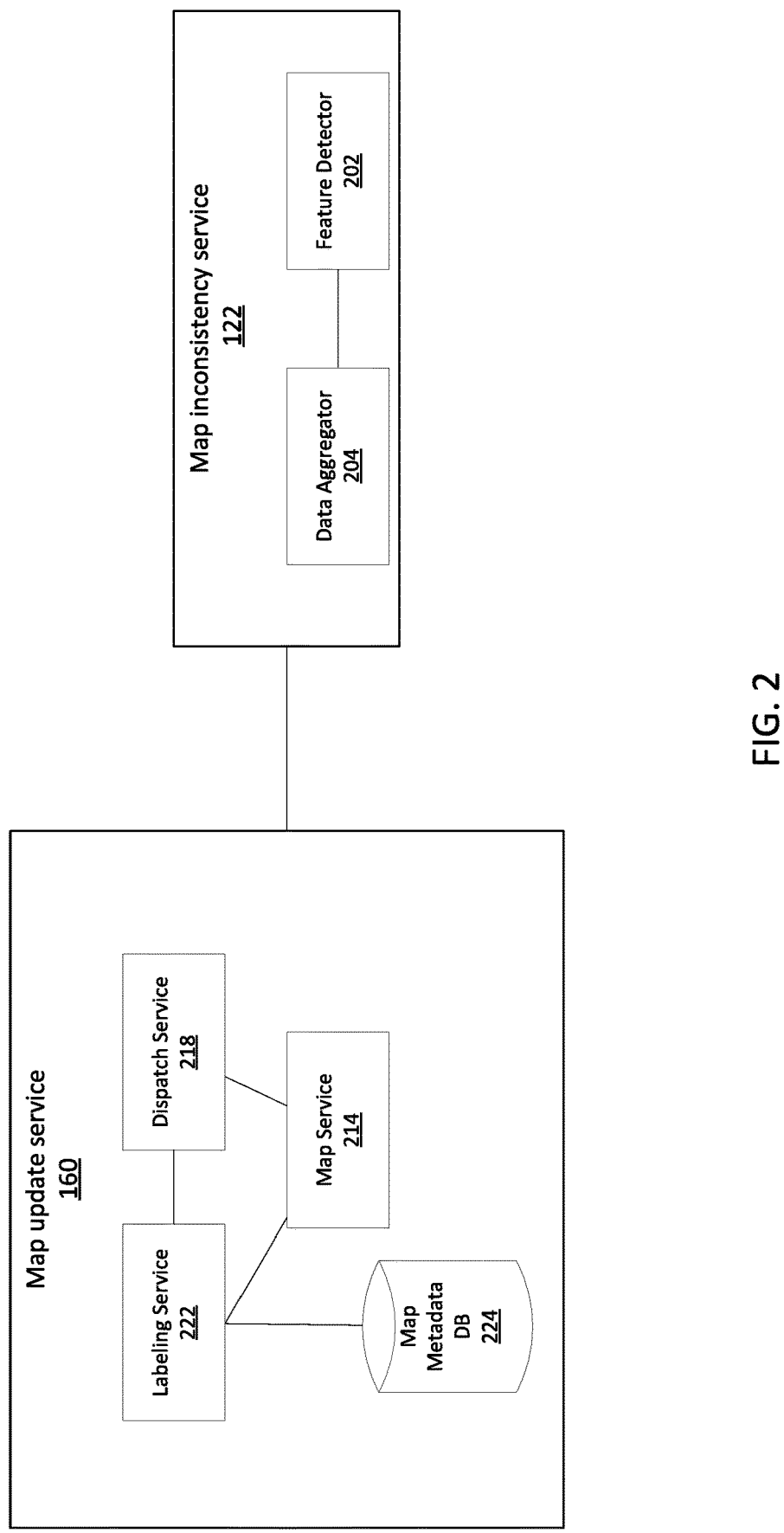
FIG. 2 shows an example system for updating a map portion to resolve inconsistencies between the map portion and sensor data in accordance with some aspects of the present technology.

FIG. 2 illustrates an example system embodiment showing the map update service 160 and the map inconsistency service 122 in greater detail. While the system illustrated in FIG. 2 is discussed with respect to the method illustrated in FIG. 6, it should be appreciated that each of the figures represents their own separate embodiment and should not be limited by such cross-reference between the figures except as defined in the claims.

The map inconsistency service 122 functions to determine when features illustrated in the pre-mapped high definition map stored in map database 123 are inconsistent with features in current data detected by sensors 104-106. While in some embodiments sensors 104-106 may capture data at a lower resolution than is reflected in the high definition map, the current data captured by sensors 104-106 can be sufficient to determine such inconsistencies. Detecting these inconsistencies is important because the high definition map can become outdated and no longer reflect the configuration of the road. The current data from sensors 104-106 reflect the current configuration of the road.

As the autonomous vehicle 102 navigates a route, sensors 104-106 capture current data reflecting the environment around the autonomous vehicle 102. The data aggregator 204 can accumulate the current data from the at least one sensor 104-106 as the autonomous vehicle 102 passes through a geographic area. Even over a small distance, data aggregator 204 can accumulate current data from the same sensor as the sensor continuously collects data. For example, in the case of a LIDAR sensor, the LIDAR continuously creates a point map from current data collected from the environment around the autonomous vehicle 102, and this data is aggregated by data aggregator 204.

While current data is being captured by the at least one sensor 104-106 of the autonomous vehicle 102, in some embodiments the feature detector 202 can detect new features represented in the captured current data by clustering the data into feature types, and can compare the detected features in the captured current data with features represented in the pre-mapped data, e.g. the map stored in map database 123.

In some instances, the feature detector 202 can determine that the feature in the current data is different than the feature represented in the pre-mapped data. For example the pre-mapped data may reflect a lane line at a particular location on a road whereas the current data might reflect the lane line at a different location on the road. In some embodiments, the feature detector 202 can determine a type of feature based on characteristics of the current data. For example the feature detector can determine that a lane line has changed from a solid lane type to a dashed lane type. Other examples of inconsistencies might include the addition or removal of a lane line, the presence or absence of a crosswalk, the presence or absence of a stop sign or streetlight, the location of a stop sign or streetlight, etc.

If the feature detector 202 determines that the pre-mapped data does not include semantic labels that reflect the features as represented in the current data, the feature detector 202 can publish the location and type of inconsistency detected. For example, if the feature detector 202 determines that a lane line is present in a location other than where the lane line is reflected in the pre-mapped data, then the feature detector 202 can identify the location where the lane line has been detected and identify a lane boundary change.

In some embodiments, the feature detector 202 can also classify the type of change. For example when the change is with respect to a lane type changing from a dashed line to a solid line (e.g., from a passing lane to no passing), the feature detector 202 can label the inconsistency as a lane type added to a new location, removed from an expected location, or changed from how it is currently represented in the map data portion. For lane boundary changes, the feature detector 202 can also include line type (single, double), line style (solid, broken) and line color (white, yellow) of the lane boundary. For limit line changes, the feature detector 202 can also include a line style (solid, broken) of the limit line. For crosswalk changes, the feature detector 202 can also include crosswalk color (e.g., white, yellow, etc.). In addition, the feature detector 202 can identify the sensor type that detected the change, such as a LIDAR sensor or a camera.

The data aggregator 204 can mark the accumulated current data from the at least one sensor 104-106 as reflecting a detected change, and the data aggregator 204 can send the accumulated current data reflecting the inconsistency to the map update service 160. For example, the accumulated current data can include a low-resolution point map reflecting the inconsistency. The accumulated current data may also have any other sensor information from the autonomous vehicle 102, such as camera data to determine lane color or bounding boxes, that can assist and be incorporated into an update to the map.

In some embodiments, the pre-mapped data can be stored as a collection of map portions. In such embodiments, the data aggregator 204 may stop sending the accumulated current data reflecting the inconsistency to the map update service 160 when the current data that the data aggregator 204 is receiving no longer applies to that map portion. The data aggregator 204 can continue to collect current data reflecting the inconsistency with respect to a different map portion. In some embodiments, a map portion can be defined by a geographic boundary having location coordinates such as might be reflected on a tile of a physical map.

In some embodiments, the map service 214 can indicate the current data as low-resolution data, which prevents the current data from being included directly into any updates to the pre-mapped data (but in some embodiments, the low-resolution data can be used to make labeling revisions which are included in the pre-mapped data). The map service 214 can manage versions of map portions and access to the map portions. Once a version of a map portion has been brought under management of the map service 214, the map service can store and make the version of the map portion accessible for review, and when appropriate, inclusion in the latest version of the map data for use by the autonomous vehicle 102.

Once the data received has been stored and put under management of map service 214 as a version of a map portion, the labeling service 222 can retrieve the version of the map portion that shows the inconsistency with the pre-mapped data map portion, and review the low-resolution current data against the pre-mapped data map portion to confirm the existence of the inconsistency.

In some embodiments, if the labeling service 222 confirms the inconsistency, the labeling service 222 can cause the relevant map portion of the pre-mapped data to become marked as restricted in the map service 214. When a map portion is marked as restricted by map service 214, this information can be published to the autonomous vehicle 102 and the autonomous vehicle can be prohibited from piloting itself within the area represented on the restricted map portion. The autonomous vehicle 102 would be brought to a gentle stop. In some embodiments, the autonomous vehicle 102 can continue to navigate if the labeling service 222 confirms the inconsistency as long as the scope of the changes would not make driving unsafe. In some embodiments, the autonomous vehicle 102 may be able to dynamically analyze the changes and modify semantic labels on the map and navigate accordingly, and in some embodiments an administrator may be able to navigate the autonomous vehicle 102 through the changed area in real time or near real time.

In some embodiments, the labeling service 222 can further determine whether the inconsistency can be remedied with the low-resolution current data. If the inconsistency is of such a nature that new high-resolution data is required, the dispatch service 218 can schedule a special purpose map vehicle to remap the location represented in the map portion. New high-resolution data can be required when large map portions are inconsistent, details of the inconsistency are not sufficiently clear to relabel the map portion, or for data deemed critical for the piloting of the autonomous vehicle 102. An example of a critical inconsistency that might require new high-resolution data would include extensive repainting in the drivable area related to new intersections, the addition of a new light rail line, etc.

In response to the labeling service 222 determining that the inconsistency can be remedied with the low-resolution current data, the labeling service 222 can analyze the received low-resolution current data and the pre-mapped data to relabel the map data, which yields an updated map data portion. The labeling service 222 can be performed using heuristics to identify patterns that require relabeling, or can utilize machine learning algorithms to perform the relabeling. In some embodiments, all or a portion of the relabeling can be performed manually, and the machine learning algorithms provides a clue for human labelers to revise and update the map. The autonomous vehicle 102 may then in some embodiments be brought to a stop, and in some embodiments be manually piloted remotely on a real-time or near real-time basis.

The labeling service 222 can associate the revised map data portion with the sources of data used to create it, which includes the low-resolution current data from the autonomous vehicle 102 sensor 104-106, and the high-resolution pre-mapped data from the previous version of the map portion which provides the high definition map points addressed above, and stores this information in the map metadata database 224. If new revisions are made to the revised map data portion, the labeling service 222 may save the updated low-resolution current data from the autonomous vehicle 102 sensor 104-106, upon which the new revised map data portion was based, into the map metadata database 224. The low-resolution current data may be versioned and appropriately associated with the corresponding revised map data portion.

Figure 3:
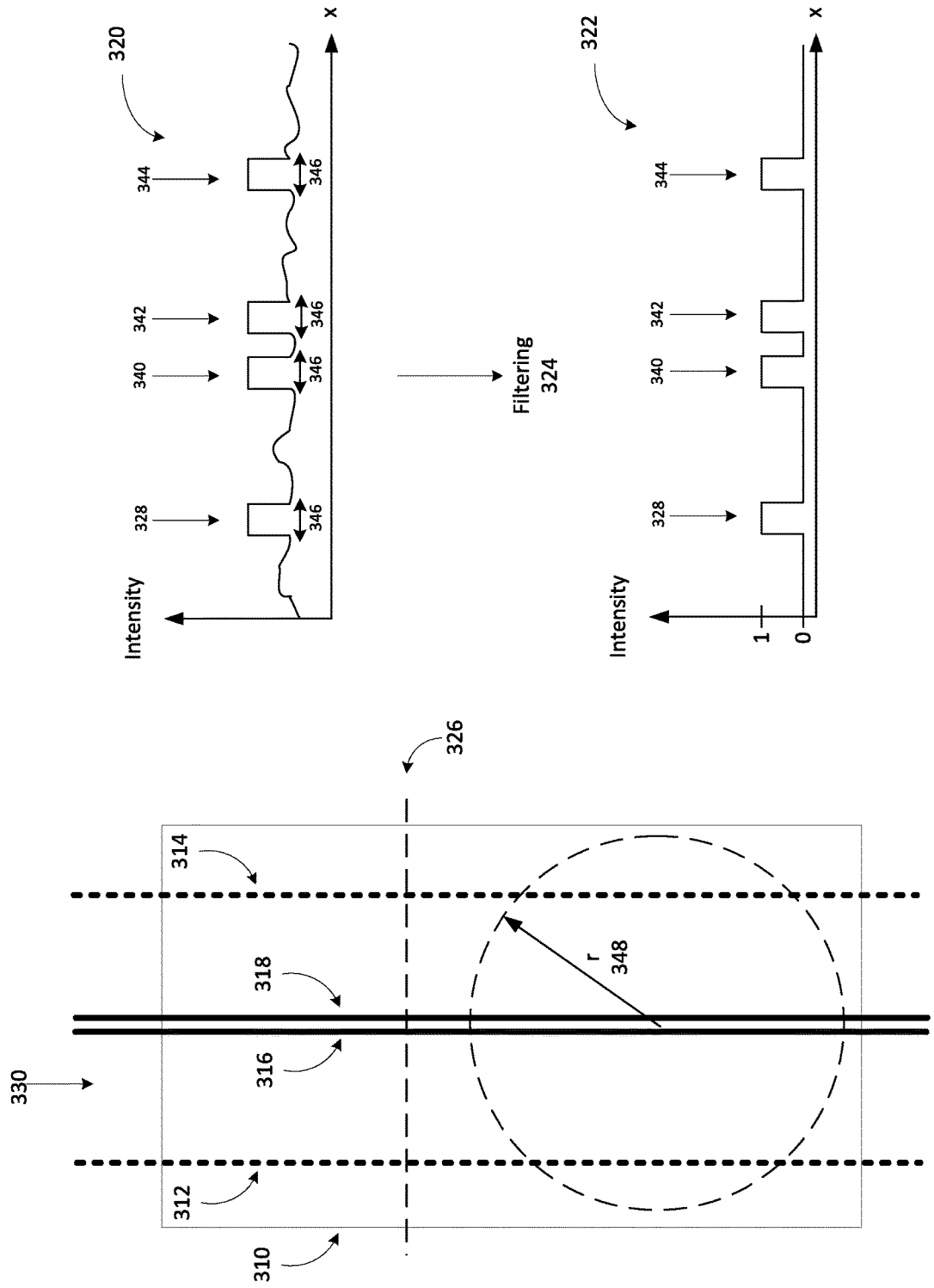
FIG. 3 shows an example visualization of data showing sensor data detecting inconsistencies with the map portion in accordance with some aspects of the present technology.

FIG. 3 shows an example visualization sensor data detecting inconsistencies with the map portion in accordance with some aspects of the present technology. Road 310 of graphical representation 330 includes one or more lane boundaries, such as dashed line lane boundaries 312 and 314, and solid line lane boundary 318. As an autonomous vehicle navigates a route that includes road 310, the autonomous vehicle can receive current data from one or more sensors that can indicate an inconsistency between pre-mapped data describing a location on a map, and a current data describing a feature of the location. For example, the pre-mapped data included lane boundaries 312, 316, and 318 from the last pass of a special purpose mapping vehicle, but since that time road 310 has been repainted to include lane boundary 314 (e.g., a new lane was added).

In order to detect road 310 and the features on the road, such as lane boundaries, crosswalks, turning lanes, etc., the autonomous vehicle can sense its surrounding environment through at least one sensor mounted to or otherwise disposed upon the autonomous vehicle. For example, the sensor(s) could be part of a sensor system that includes LIDAR sensors and/or camera sensors. Other exemplary sensor systems can include radar sensor systems, global positioning system (GPS) sensor systems, inertial measurement units (IMU), infrared sensor systems, laser sensor systems, sonar sensor systems, and the like. The LIDAR sensors can, for example, detect and/or capture changes in intensity between painted portions of road 310 (e.g., lane boundaries 312, 314, 316, and 318) and unpainted portions of road 310. The lighter colored painted portions of road 310 will show up as higher intensity areas than the darker, unpainted portions of road 310.

An intensity map can be built from the sensors detecting changes in intensity on road 310, and can then be compared with features on the pre-mapped map. Graph 320, for example, illustrates intensity as a function of position (x) along a portion of an intensity map for road 310, and graph 322 illustrates intensity as a function of position (x) along a portion of an intensity map for road 310 after filtering 324. In some embodiments, graph 320 represents a cross section 326 of road 310, which shows peak 328, peak 340, peak 342, and peak 344 of higher intensities corresponding to lane boundary 312, lane boundary 316, lane boundary 318, and lane boundary 314, respectively. The lower intensity areas correspond to the unpainted portions of road 310. In some embodiments, LIDAR data can be collected in a circular sweep of radius r (348), which can also build graph 320 and graph 322.

In some embodiments, a noisy signal from the sensors can be cleaned up. In some embodiments, for example, intensity measurements from LIDAR can indicate a lane boundary when a peak in intensity spans at least a threshold distance 346 (in some embodiments, however, such as one that collects low density data in a circular sweep, a lane boundary can be detected by being narrower than a threshold distance 346). This is because a painted lane boundary should produce a higher intensity signal for over a specific width. Any peak in intensity that is outside the threshold distance 346 can be filtered out during filtering 324 as noise.

Additionally and/or alternatively, in some embodiments the change in intensity, rather than its width, may be used to filter out noise within the current data. For example, any peak less than a threshold change from the average non-peak intensity can be removed as noise during filtering 324. While the embodiments described by FIG. 3 measure painted vs. non-painted areas of road 310 by changes in intensity, since that removes the need to calibrate sensors to be consistent across all autonomous vehicles, in some alternative embodiments the intensity can be measured to certain values. In this way, peaks at or above a certain intensity value across a threshold distance can be detected features, and other data points can be thrown out as noise during filtering 324.

Filtering 324 removes data that does not indicate a detection of a painted area of the road (e.g., noise). Once filtering 324 has been performed, the data can be binarized such that painted areas have a certain value (e.g., intensity=1), and non-painted areas have another value (e.g., intensity=0). Graph 322 shows a binary intensity as a function of position for peaks 328, 340, 342, and 344.

Figure 4:
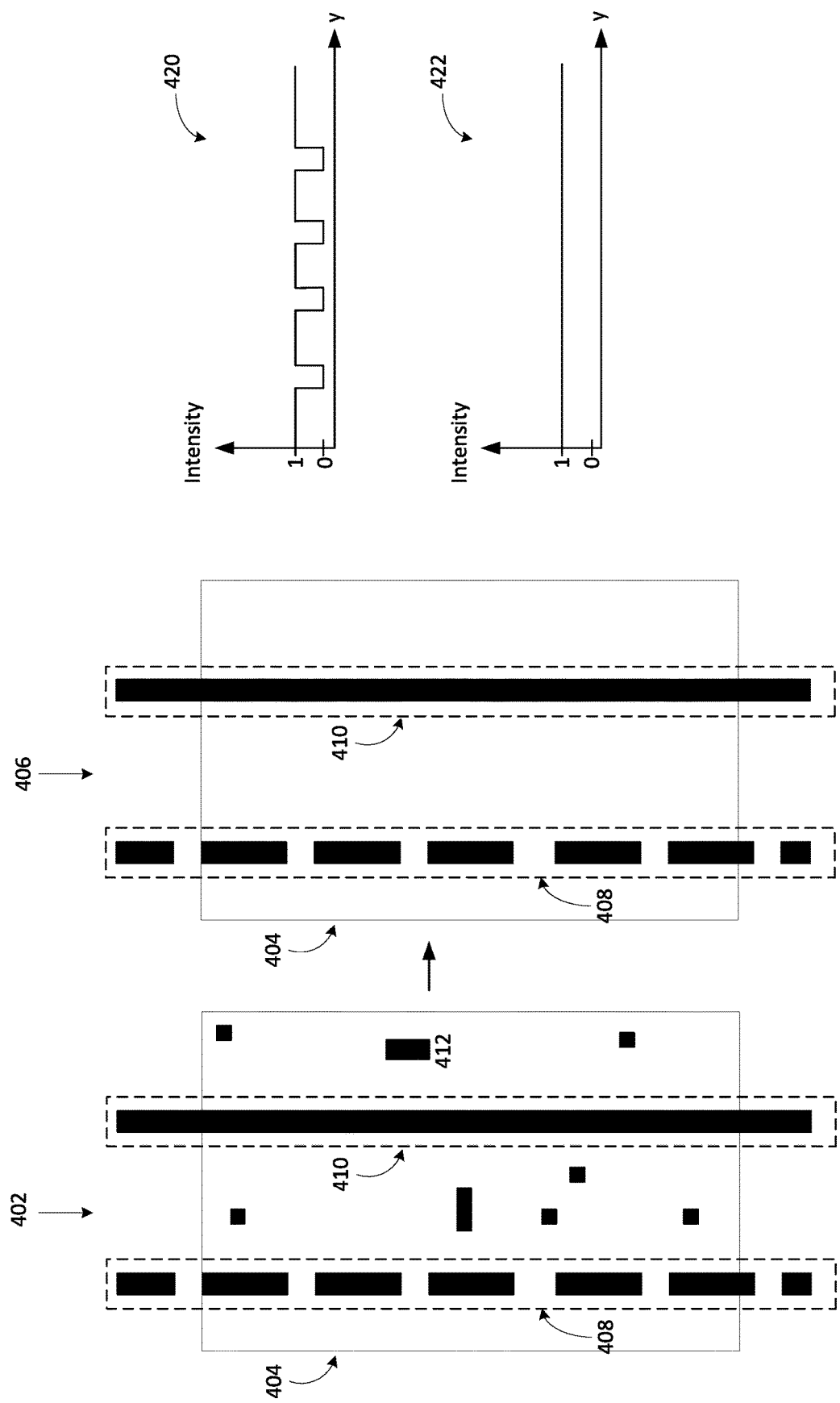
FIG. 4 shows an example visualization of data filtering and feature type classification in accordance with some aspects of the present technology.

FIG. 4 illustrates a graphical representation 402 of the current point cloud of a stretch of road 404. The current data describes, such as was described in FIG. 3, areas where the high intensity areas (e.g., painted lane boundaries) span a spatial closeness narrower than a threshold width, and the high intensity areas being above a threshold intensity of low intensity areas (e.g., bare road). Graphical representation 406 illustrates the current point cloud after data filtering and feature type classification in accordance with some aspects of the present technology.

The current data can be clustered into one or more features based on a threshold spatial closeness of high intensity areas. For example, current data can be clustered into feature 408 and feature 410 based on connecting each high intensity pixel with another high intensity pixel when the pixels are within a threshold distance of each other. In some embodiments, heuristics can be applied to the clustered pixels that generate certain structures and/or shapes of features. For example, the shape and structure of the high intensity area of feature 408 can be indicative of a dashed lane boundary, and the shape and structure of the high intensity area of feature 410 can be indicative of a solid lane boundary. In some embodiments, the connected pixels can be clustered based on a determination that the shape of the feature is within a same direction and/or within the same plane as road 404.

Any pixels, such as pixels 412, which do not fall within the clustered pixels are removed during filtering and are accordingly removed in graphical representation 406.

In some embodiments, features can be classified by type in accordance with an analysis of a structure of the clustered current data. For example, graph 420 illustrates intensity as a function of position (y) along a portion of an intensity map for feature 408, and graph 422 illustrates intensity as a function of position (y) along a portion of an intensity map for feature 410. In some embodiments, graph 420 represents a cross section of road 404, which shows multiple peaks in intensity corresponding to the dashed lines in feature 408. The multiple peaks (between painted areas and bare road areas) in intensity can indicate that feature 408 is a dashed lane boundary (e.g., a passing lane). Conversely, graph 422 shows a constant or near constant intensity, and so can classify feature 410 as a solid line lane boundary.

Figure 5:
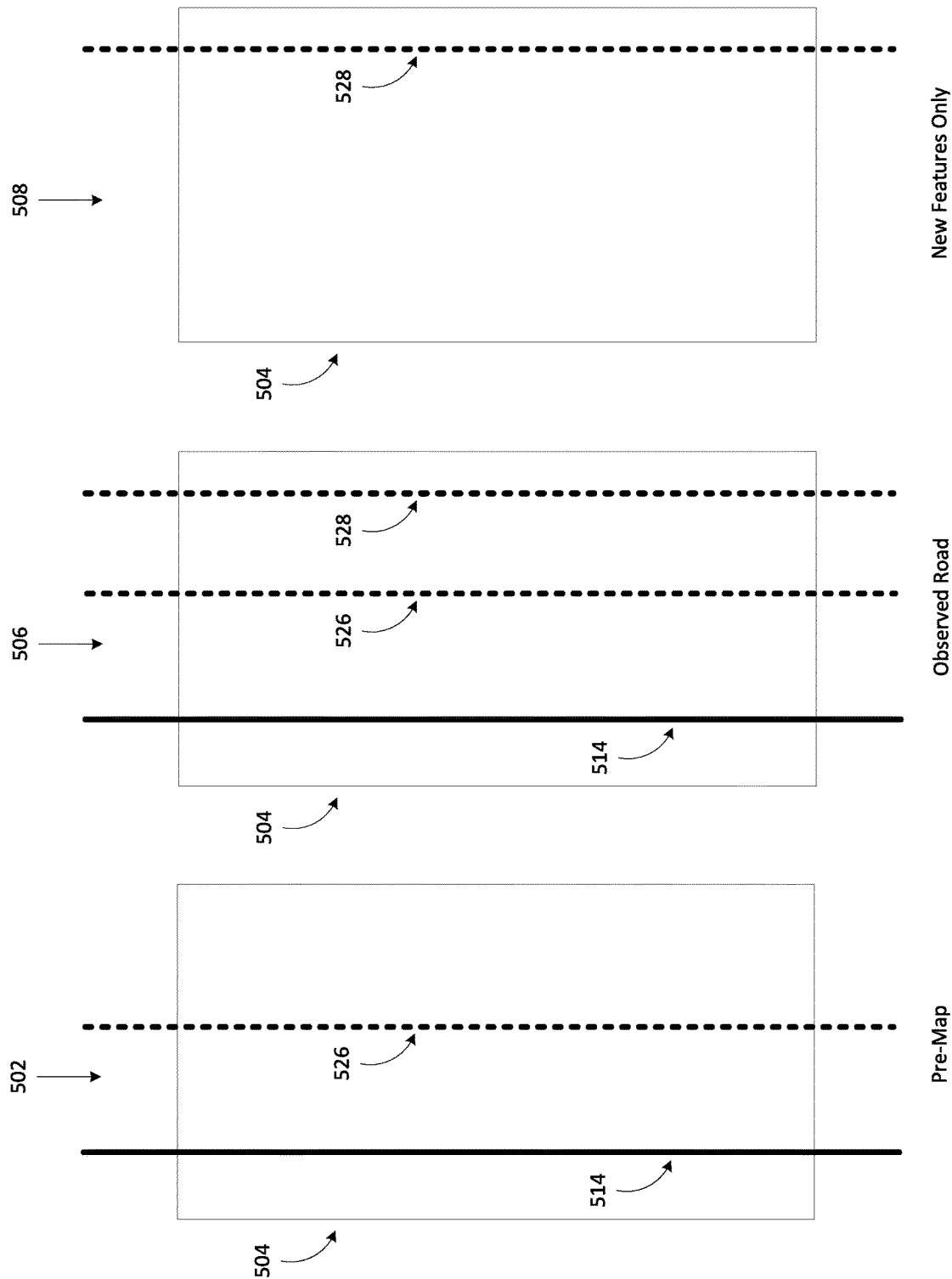
FIG. 5 shows an example visualization of data optimization in accordance with some aspects of the present technology.

FIG. 5 shows an example visualization of data optimization in accordance with some aspects of the present technology. Graphical representation 502 shows the pre-map from the pre-mapped data previously taken from a special purpose mapping vehicle. At this point, road 504 includes feature 514, which is a solid lane boundary, and feature 526, which is a dashed lane boundary. In some embodiments, the pre-map may be a high-resolution point cloud derived from data from a high-resolution sensor system, such as a LIDAR system on a special purpose mapping vehicle.

At a subsequent time, road 504 may be repainted, such as shown in graphical representation 506, so that when the autonomous vehicle navigates down road 504, the autonomous vehicle senses new feature 528 (another dashed lane boundary) as well as feature 514 and feature 526. In some embodiments, the current data can be a lower resolution point cloud from a LIDAR system on the autonomous vehicle.

To save computational time and resources, in some embodiments the data filtering and clustering into new features can be performed on inconsistent features only, such as feature 528 in graphical representation 508. Thus, features 514 and 526 are not included in the clustering and filtering processes, since they are consistent with the pre-mapped data.

The map can include, either provisionally or permanently updated semantic data about the new features (allowing the vehicle to continue navigating for part of road 504 or to bring the autonomous vehicle to a safe stop). The map can, for example, update the pre-mapped semantic data from the high-resolution sensor system based on the clustered current data captured over a period of time. For example, as the autonomous vehicle navigates a route, it will collect data and detect new features along the way. If a certain feature is detected at a certain time, say a new lane boundary, then as the autonomous vehicle drives it will see more of the new lane boundary. The new lane boundary can be more heavily weighted as a new feature since it would be consistent with what was captured just previously by the autonomous vehicle. As a result, in some embodiments new features and their semantic labels can be added to the map based on iterating through the clustered pixels that represent inconsistencies with the pre-mapped data from a number of previous measurements.

In some embodiments, the map can define a map portion of the map by a boundary of location coordinates, where the pre-mapped data is an earlier version of the map portion, and the clustered current data is a later, revised version of the map portion. An update to the map's information can be enabled by combining the pre-mapped data from the high-resolution sensor system with revised semantic labels, where the revised semantic labels were generated based on the type of the feature (e.g., solid lane boundary or dashed lane boundary). In some embodiments, the map information is updated only when the updated information about the map portion is within a drivable location for the autonomous vehicle. Any inconsistencies not within drivable portions can be excluded to save on compute resources and time.

Figure 6:
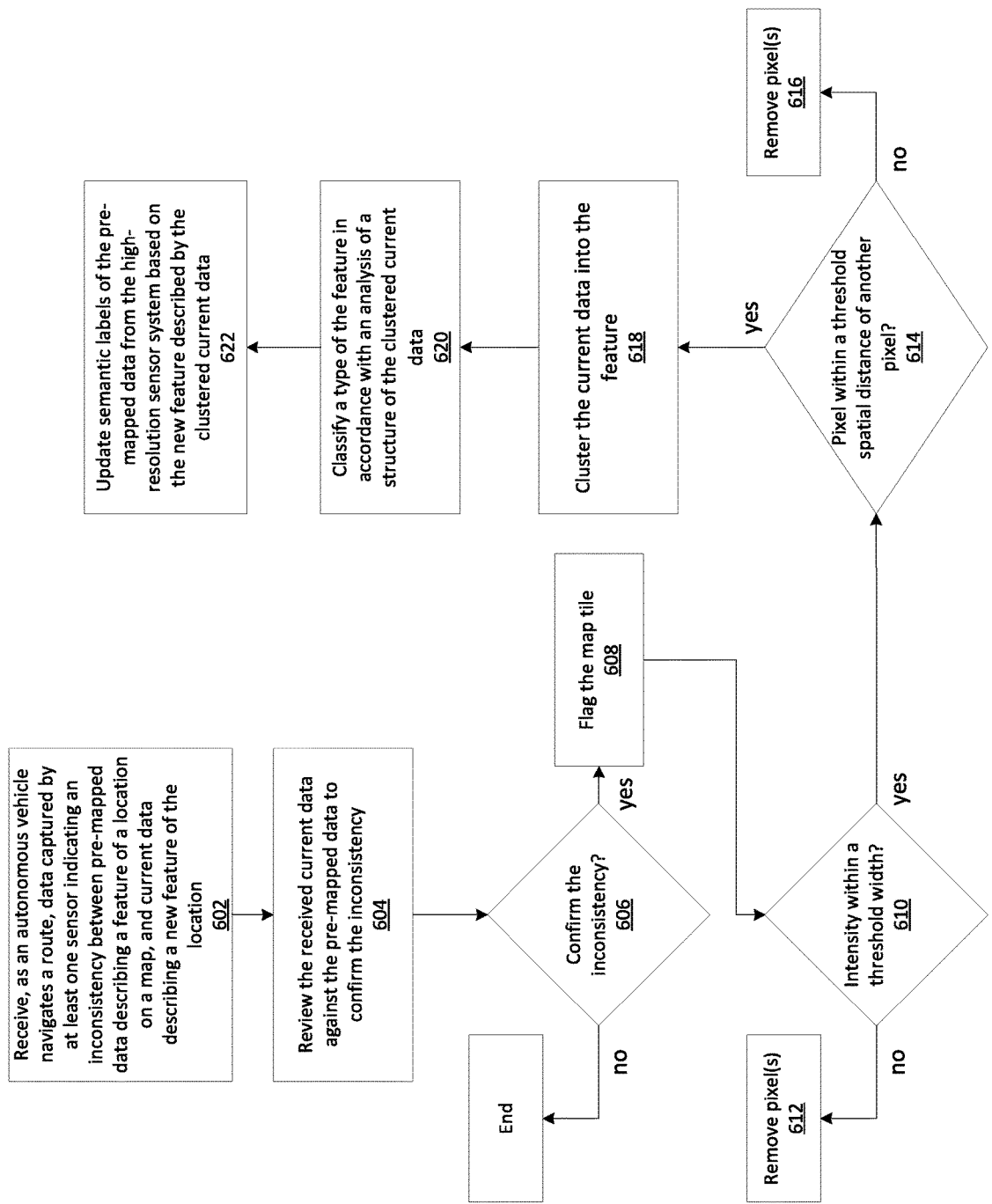
FIG. 6 shows an example method for detecting inconsistencies between the map portion and sensor data in accordance with some aspects of the present technology.

FIG. 6 shows an example method for detecting inconsistencies between the map portion and sensor data in accordance with some aspects of the present technology. As the autonomous vehicle navigates a route, the autonomous vehicle can receive (602) data captured by at least one sensor indicating an inconsistency between a pre-mapped data describing a feature of a location on a map, and a current data describing the feature of the location.

The received current data can be reviewed (604) against the pre-mapped data to confirm (606) the inconsistency. If not, then method 600 ends. If the inconsistency is confirmed, then the map tile can be flagged (608) for further processing.

What follows can be multiple steps for filtering and determining features within the current data. If the high intensity areas do not reach (610) a threshold width, then high intensity pixels are removed as false detections of re-painted areas (612). But if the high intensity areas exceed (610) the threshold width, then it must be determined (614) whether the high intensity pixels are within a threshold spatial distance of other high intensity pixels. So for each high intensity pixel, if it is not within the threshold spatial distance of another high intensity pixel, then the high intensity pixel is removed (616). If a high intensity pixel is within the threshold spatial distance to another high intensity pixel, then the high intensity pixel can be clustered (618) with the others into one or more features.

Once the current data has been clustered into a feature, the feature can be classified (620) into a specific type (e.g., solid lane boundary, dashed lane boundary, crosswalk, etc.) in accordance with an analysis of a structure of the clustered current data. Semantic labels of the pre-mapped data from the high-resolution sensor system can be updated (622) based on the new feature described by the clustered current data.

While the present technology has been described above with reference to a single autonomous vehicle, it will be appreciated by those of ordinary skill in the art that the autonomous vehicle can be one vehicle in a fleet of vehicles. Each vehicle can benefit from updates made to the map portion as a result of data collected by any other vehicle. In other words, all vehicles in the fleet of vehicles can have access to the most recent map data. Additionally, the present technology can also wait to update a map portion until a second vehicle in the fleet also flags a similar inconsistency as reported by a first vehicle. The data from the sensors of the first and second vehicle can be collectively used in the relabeling of the map portion.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Figure 7:
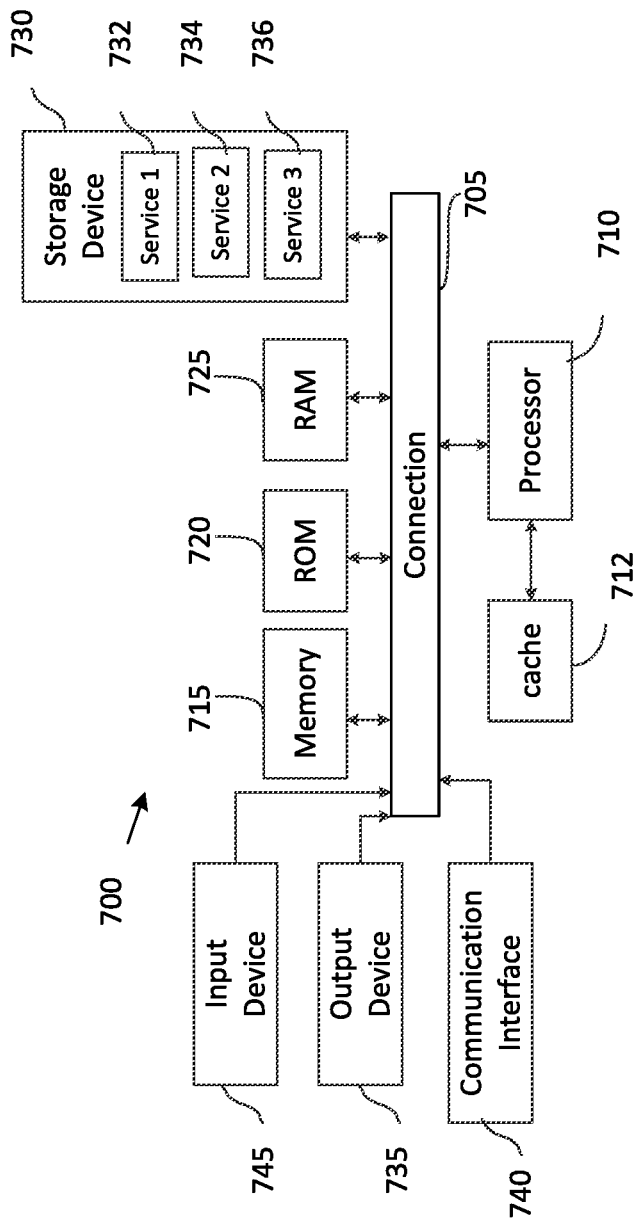
FIG. 7 shows an example of a system for implementing certain aspects of the present technology.

FIG. 7 shows an example of computing system 700, which can be for example any computing device making up internal computing system 110, remote computing system 150, (potential) passenger device executing rideshare app 170, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read-only memory (ROM) 720 and random access memory (RAM) 725 to processor 710. Computing system 700 can include a cache of high-speed memory 712 connected directly with, in close proximity to, or integrated as part of processor 710.

Processor 710 can include any general purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. There is no restriction on operating on any particular hardware arrangement, and therefore the basic features here may easily be substituted for improved hardware or firmware arrangements as they are developed.

Storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
   receiving, as an autonomous vehicle navigates a route, data indicating an inconsistency between pre-mapped data describing a location on a map, and current data describing a feature of the location, wherein the current data is captured by at least one sensor of the autonomous vehicle;
   clustering the current data together based on associated intensity of the feature and a threshold spatial closeness of pixels within the feature, wherein the clustering describes the feature;
   determining a structure of the feature based on an analysis of horizontal cross-sections in the current data, wherein the structure of the feature includes lane information of a road;
   determining that a semantic label associated with the structure of the feature does not correspond to semantic labels associated with the feature in the pre-mapped data; and
   updating the semantic labels of the pre-mapped data based on the feature described by the clustered current data to generate modified pre-mapped data.

2. The method of claim 1, the method further comprising:
classifying a type of the feature in accordance with the analysis of the structure of the clustered current data; and
combining the modified pre-mapped data with revised semantic labels, the revised semantic labels having been generated based on the type of the feature.

3. The method of claim 1, the method further comprising:
connecting a pixel of the feature with another pixel of the feature when the another pixel is within a threshold distance of the pixel;
clustering connected pixels into the feature when the connected pixels describe a shape of the feature; and
removing pixels that do not fall within the clustered connected pixels, wherein the map is revised based on iterating through the clustered pixels that represent inconsistencies with the pre-mapped data.

4. The method of claim 3, wherein the connected pixels are clustered based on a determination that the shape of the feature is within a same direction as the road.

5. The method of claim 1, wherein the current data describing the feature of the location is captured by at least one sensor capturing a change in the associated intensity, and wherein the threshold spatial closeness of high intensity areas are narrower than a threshold width, the high intensity areas being above a threshold intensity of low intensity areas.

6. The method of claim 1, the method further comprising:
defining a map portion of the map by a boundary of location coordinates, wherein the pre-mapped data is an earlier version of the map portion, and the clustered current data is a later, revised version of the map portion; and
modifying the map in accordance with the revised version of the map portion when the revised version of the map portion is within a drivable location for the autonomous vehicle.

7. A computing system comprising:
at least one non-transitory computer readable medium comprising instructions stored thereon, wherein the instructions are effective to cause the computing system to:
receive, as an autonomous vehicle navigates a route, data indicating an inconsistency between pre-mapped data describing a location on a map, and current data describing a feature of the location, wherein the current data is captured by at least one sensor of the autonomous vehicle;
cluster the current data together based on associated intensity of the feature and a threshold spatial closeness of pixels within the feature, wherein the clustering describes the feature;
determine a structure of the feature based on an analysis of horizontal cross-sections in the current data, wherein the structure of the feature includes lane information of a road;
determine that a semantic label associated with the structure of the feature does not correspond to semantic labels associated with the feature in the pre-mapped data; and
update the semantic labels of the pre-mapped data based on the feature described by the clustered current data to generate modified pre-mapped data.

8. The computing system of claim 7, wherein the instructions are effective to cause the computing system to further:
classify a type of the feature in accordance with the analysis of the structure of the clustered current data; and
revise the map by combining the modified pre-mapped data with revised semantic labels, the revised semantic labels having been generated based on the type of the feature.

9. The computing system of claim 7, wherein the instructions are effective to cause the computing system to further:
connect a pixel of the feature with another pixel of the feature when the another pixel is within a threshold distance of the pixel;
cluster the connected pixels into the feature when the connected pixels describe a shape of the feature; and
remove pixels that do not fall within the clustered connected pixels, wherein the map is revised based on iterating through the clustered pixels that represent inconsistencies with the pre-mapped data.

10. The computing system of claim 9, wherein the connected pixels are clustered based on a determination that the shape of the feature is within a same direction as the road.

11. The computing system of claim 7, wherein the current data describing the feature of the location is captured by at least one sensor capturing a change in the associated intensity, and wherein the threshold spatial closeness of high intensity areas are narrower than a threshold width, the high intensity areas being above a threshold intensity of low intensity areas.

12. The computing system of claim 7, wherein the instructions are effective to cause the computing system to further:
define a map portion of the map by a boundary of location coordinates, wherein the pre-mapped data is an earlier version of the map portion, and the clustered current data is a later, revised version of the map portion; and
modify the map in accordance with the revised version of the map portion when the revised version of the map portion is within a drivable location for the autonomous vehicle.

13. At least one non-transitory computer readable medium comprising instructions stored thereon, wherein the instructions are effective to cause an autonomous vehicle to:
receive, as the autonomous vehicle navigates a route, data indicating an inconsistency between pre-mapped data describing a location on a map, and current data describing a feature of the location, wherein the current data is captured by at least one sensor of the autonomous vehicle;
cluster the current data together based on associated intensity of the feature and a threshold spatial closeness of pixels within the feature, wherein the clustering describes the feature;
determine a structure of the feature based on an analysis of horizontal cross-sections in the current data, wherein the structure of the feature includes lane information of a road;
determine that a semantic label associated with the structure of the feature does not correspond to semantic labels associated with the feature in the pre-mapped data; and
update the semantic labels of the pre-mapped data based on the feature described by the clustered current data to generate modified pre-mapped data.

14. The at least one non-transitory computer readable medium of claim 13, wherein the instructions are effective to cause the autonomous vehicle to:

classify a type of the feature in accordance with the analysis of the structure of the clustered current data; and revise the map by combining the modified pre-mapped data with revised semantic labels, the revised semantic labels having been generated based on the type of the feature.

15. The at least one non-transitory computer readable medium of claim 13, wherein the instructions are effective to cause the autonomous vehicle to:

connect a pixel of the feature with another pixel of the feature when the another pixel is within a threshold distance of the pixel;

cluster the connected pixels into the feature when the connected pixels describe a shape of the feature; and remove pixels that do not fall within the clustered connected pixels, wherein the map is revised based on iterating through the clustered pixels that represent inconsistencies with the pre-mapped data.

16. The at least one non-transitory computer readable medium of claim 15, wherein the connected pixels are clustered based on a determination that the shape of the feature is within a same direction as the road.

17. The at least one non-transitory computer readable medium of claim 13, wherein the current data describing the feature of the location is captured by at least one sensor capturing a change in the associated intensity, and wherein the threshold spatial closeness of high intensity areas are narrower than a threshold width, the high intensity areas being above a threshold intensity of low intensity areas.

* * * * *